(12) United States Patent
Zhai et al.

(10) Patent No.: US 10,887,145 B2
(45) Date of Patent: Jan. 5, 2021

(54) DATA PROCESSING DEVICE AND METHOD

(71) Applicant: SZ DJI TECHNOLOGY CO., LTD., Shenzhen (CN)

(72) Inventors: Chunhua Zhai, Shenzhen (CN); Jianhua Zhu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/731,792

(22) Filed: Dec. 31, 2019

(65) Prior Publication Data

US 2020/0136872 A1 Apr. 30, 2020

Related U.S. Application Data

(63) Continuation of application No. PCT/CN2017/095290, filed on Jul. 31, 2017.

(51) Int. Cl.
*H04L 27/26* (2006.01)

(52) U.S. Cl.
CPC ........ *H04L 27/265* (2013.01); *H04L 27/2605* (2013.01); *H04L 27/2665* (2013.01); *H04L 27/2697* (2013.01)

(58) Field of Classification Search
CPC . H04L 27/25; H04L 27/2605; H04L 27/2665; H04L 27/2697; H04L 27/265
See application file for complete search history.

(56) References Cited

U.S. PATENT DOCUMENTS

| | | |
|---|---|---|
| 2005/0276245 A1 | 12/2005 | Hidaka |
| 2006/0009212 A1* | 1/2006 | Kim ............ H04B 17/336 455/423 |
| 2007/0092020 A1* | 4/2007 | Seki ............ H04L 5/0058 375/267 |
| 2008/0298519 A1 | 12/2008 | Tsutsui et al. |
| 2010/0199301 A1* | 8/2010 | Hayashi ........... H04H 20/33 725/32 |

FOREIGN PATENT DOCUMENTS

CN 101836382 A 9/2010

OTHER PUBLICATIONS

The World Intellectual Property Organization (WIPO) International Search Report and Written Opinion for PCT/CN2017/095290 dated May 2, 2018 7 pages.

* cited by examiner

*Primary Examiner* — Ted M Wang
(74) *Attorney, Agent, or Firm* — Anova Law Group, PLLC

(57) ABSTRACT

A data processing device includes a first circuit and a second circuit. The first circuit includes a first front-end circuit configured to process first data to obtain first demodulated data, and a back-end circuit coupled to the first front-end circuit and configured to receive the first demodulated data. The second circuit includes a second front-end circuit configured to process second data to obtain second demodulated data, and a transmitter coupled to the second front-end circuit and configured to transmit the second demodulated data to the first circuit. The back-end circuit is further configured to receive the second demodulated data, and process the first demodulated data and the second demodulated data.

16 Claims, 4 Drawing Sheets

DATA PROCESSING DEVICE AND METHOD

CROSS-REFERENCE TO RELATED APPLICATION

This application is a continuation of International Application No. PCT/CN2017/095290, filed Jul. 31, 2017, the entire content of which is incorporated herein by reference.

TECHNICAL FIELD

The present disclosure relates to data processing and, more particularly, to data processing using multiple processing circuits.

BACKGROUND

Multi-antenna technologies can improve the performance of wireless links, such as improving the signal-to-noise ratio of the received signals. Therefore, multi-antenna technologies are widely used in modern wireless communication systems to improve the performance of the systems. A conventional multi-antenna wireless communication system includes one single chip coupled to several antennas and the single chip is used to process data, also referred to as "antenna data," from the multiple antennas.

However, when a single chip is coupled to multiple antennas, a relatively high processing capability is needed to process the data from the multiple antennas. The more antennas are coupled to one single chip, the higher processing capability the chip may need to process the data. A single chip has a limited processing capability. Further increasing the processing capability will increase the cost for designing and manufacturing the chip, reducing the performance-to-cost ratio. Usually, in a conventional multi-antenna wireless communication system, one single chip is used to process data from six or less coupled antennas. There lacks chips that can support more than six antennas. This limits the performance of the conventional multi-antenna systems, making them not suitable for wireless applications that require a relatively high reception performance, such as the application in a long-distance wireless image transmission system.

SUMMARY

In accordance with the present disclosure, there is provided a data processing device including a first circuit and a second circuit. The first circuit includes a first front-end circuit configured to process first data to obtain first demodulated data, and a back-end circuit coupled to the first front-end circuit and configured to receive the first demodulated data. The second circuit includes a second front-end circuit configured to process second data to obtain second demodulated data, and a transmitter coupled to the second front-end circuit and configured to transmit the second demodulated data to the first circuit. The back-end circuit is further configured to receive the second demodulated data, and process the first demodulated data and the second demodulated data.

Also in accordance with the present disclosure, there is provided a data processing method including a first circuit processing first data to obtain first demodulated data, a second circuit processing second data to obtain second demodulated data, the second circuit transmitting the second demodulated data to the first circuit, and the first circuit processing the first demodulated data and the second demodulated data.

Also in accordance with the present disclosure, there is provided a data processing circuit including a front-end circuit configured to process data to obtain first demodulated data, and a back-end circuit coupled to the front-end circuit and configured to receive the first demodulated data, read second demodulated data from a storage medium, and process the first demodulated data and the second demodulated data.

Also in accordance with the present disclosure, there is provided a data processing method including processing data to obtain first demodulated data, reading second demodulated data from a storage medium, and processing the first demodulated data and the second demodulated data.

Also in accordance with the present disclosure, there is provided a data processing circuit including a front-end circuit configured to process data to obtain demodulated data; and a transmitter coupled to the front-end circuit and configured to transmit the demodulated data to a storage medium associated with another circuit.

Also in accordance with the present disclosure, there is provided a data processing method including processing data to obtain demodulated data; and transmitting, by the circuit, the demodulated data to a storage medium associated with another circuit.

DESCRIPTION OF THE EMBODIMENTS

Hereinafter, embodiments consistent with the disclosure will be described with reference to the drawings, which are merely examples for illustrative purposes and are not intended to limit the scope of the disclosure. Wherever possible, the same reference numbers will be used throughout the drawings to refer to the same or like parts.

Figure 1:
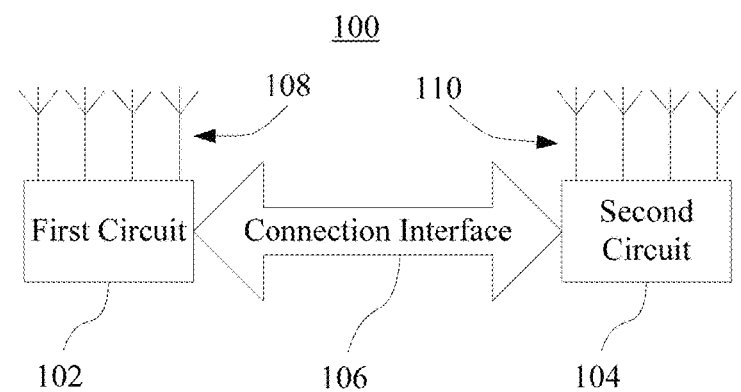
FIG. 1 is a schematic block diagram showing a data processing device according to an exemplary embodiment.

FIG. 1 is a schematic block diagram showing an exemplary data processing device 100 consistent with embodiments of the disclosure. The data processing device 100 can be, for example, a wireless communication system, and includes a first circuit 102 and a second circuit 104 coupled to each other via a connection interface 106. Each of the first circuit 102 and the second circuit 104 can, for example, be integrated in a chip including an integrated circuit. The connection interface 106 can be any interface that is suitable for coupling two circuits. For example, the connection interface 106 can be a Universal Serial Bus (USB) interface, a High-Definition Multimedia Interface (HDMI), or a wireless link, such as a Wi-Fi link, a Bluetooth link, or a near-field communication link.

As shown in FIG. 1, the data processing device 100 further includes a first antenna set 108 coupled to the first circuit 102 and a second antenna set 110 coupled to the second circuit 104. Each of the first antenna set 108 and the second antenna set 110 can include one or more antennas. In some embodiments, each of the first antenna set 108 and the second antenna set 110 includes six antennas or less than six antennas.

The first antenna set 108 and the second antenna set 110 are configured to receive wireless signals. In some embodiments, each of the antennas in the first antenna set 108 and the second antenna set 110 can receive the same wireless signals from a same signal source, such as, for example, image transmission signals from an unmanned aerial vehicle, which can be, for example, Orthogonal Frequency Division Multiplexing (OFDM) signals. However, due to various factors, such as interference in the transmission paths, the wireless signals received by different antennas may contain different amount of noises. The first antenna set 108 can convert the received wireless signals to first data and send the first data to the first circuit 102 for further processing. Similarly, the second antenna set 110 can convert the received wireless signals to second data and send the second data to the second circuit 104 for further processing.

The first circuit 102 is configured to process the first data, and is also referred to as a "first data processing circuit." For example, the first circuit 102 can process, e.g., demodulate, the first data to obtain first demodulated data. Similarly, the second circuit 104 is configured to process the second data, and is also referred to as a "second data processing circuit." For example, the second circuit 104 can process, e.g., demodulate, the second data to obtain second demodulated data. After obtaining the second demodulated data, the second circuit 104 can send the second demodulated data to the first circuit 102. The first circuit 102 can then process the first demodulated data and the second demodulated data together to obtain final processed data.

Thus, consistent with the disclosure, the first circuit 102 and the second circuit 104 can first separately process received data to obtain demodulated data, and the demodulated data from both circuits is then further processed in the first circuit 102 to obtain the final processed data. In this regard, the first circuit 102 can also be referred to as a "primary circuit" or a "master circuit," and the second circuit 104 can also be referred to as a "secondary circuit" or a "slave circuit."

Figure 2A:
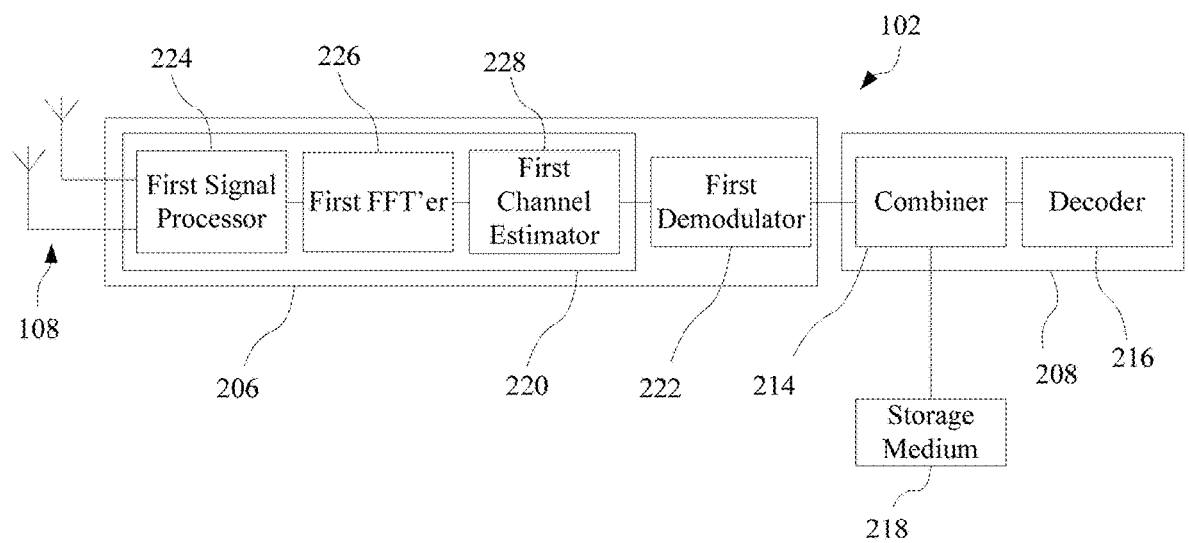
FIGS. 2A and 2B show block diagrams of a first circuit and a second circuit, respectively, of the data processing device according to exemplary embodiments.
Figure 2B:
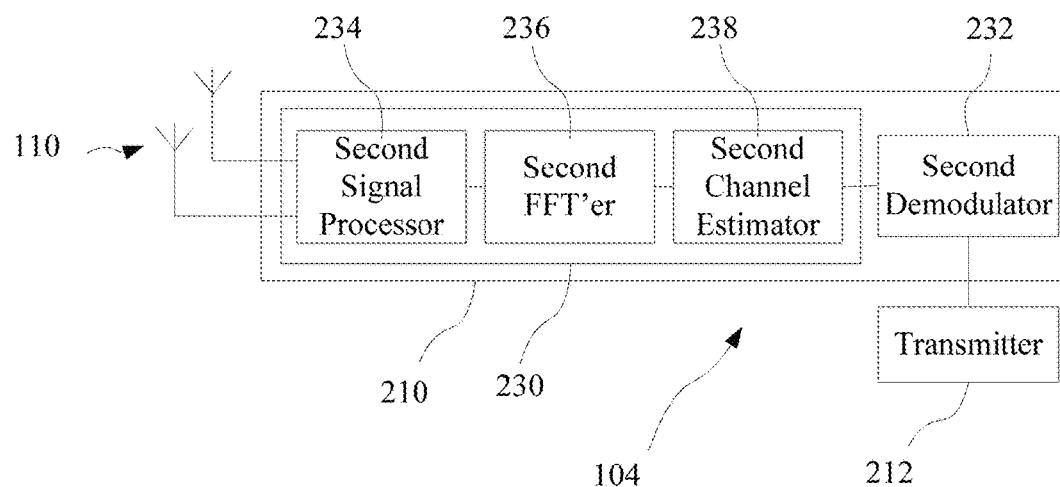

FIGS. 2A and 2B show block diagrams of an example of the first circuit 102 and an example of the second circuit 104, respectively, consistent with embodiments of the disclosure. As shown in FIG. 2A, the first circuit 202 includes a first front-end circuit 206 coupled to the first antenna set 108 and a back-end circuit 208 coupled to the first front-end circuit 206. The first front-end circuit 206 is configured to receive the first data from the first antenna set 108 and process the received first data to obtain the first demodulated data.

As shown in FIG. 2B, the second circuit 104 includes a second front-end circuit 210 coupled to the second antenna set 110. The second front-end circuit 210 is configured to receive the second data from the second antenna set 110 and process the received second data to obtain the second demodulated data. The second circuit 104 further includes a transmitter 212 coupled to the second front-end circuit 210. The transmitter 212 is configured to transmit the second demodulated data to the first circuit 102 via the connection interface 106 (not shown in FIGS. 2A and 2B).

The first front-end circuit 206, the back-end circuit 208 can be integrated in a same chip or separated in different chips. The second front-end circuit 210, the transmitter 212 can be integrated in a same chip or separated in different chips. In some embodiments, any two of these circuits 206, 208, and 210 can be in a same chip while the third one of them is in a different chip.

The back-end circuit 208 of the first circuit 102 receives the first and second demodulated data and processes the first and second demodulated data to obtain the final processed data. In some embodiments, as shown in FIG. 2A, the back-end circuit 208 includes a combiner 214 coupled to the first front-end circuit 206 and a decoder 216 coupled to the combiner 214. The combiner 214 is configured to receive and combine the first demodulated data and the second demodulated data to generate combined data. The combiner 214 can perform, for example, at least one of descrambling, de-rate matching, hybrid automatic repeat request (HARD) combination, or deinterleaving on the first demodulated data and/or the second demodulated data. The decoder 216 is configured to decode the combined data to generate the final processed data.

Although the first demodulated data and the second demodulated data ultimately originate from the same signal source, various factors may cause the first demodulated data and the second demodulated data to be asynchronous, such as processing delays and/or transmission delays. To properly combine the first demodulated data and the second demodulated data, the combiner 214 is also configured to synchronize the first demodulated data and the second demodulated data. In some embodiments, a synchronization mechanism using one or more synchronization markers for data synchronizing is adopted, as described in more detail below. For example, the transmitter 212 can add a synchronization marker to the second demodulated data and send the second demodulated data with the synchronization marker to the first circuit 102. The combiner 214 can then synchronize the first demodulated data and the second demodulated data based on the synchronization marker in the second demodulated data.

In some embodiments, the second demodulated data that is generated by the second front-end circuit 210 during a certain period of processing time can form a data subframe. The certain period of processing time can be, for example, one millisecond. The second demodulated data can form a plurality of data subframes. Each data subframe can have a subframe number. For example, each of the data subframes can be assigned a subframe number from 0 to 1023. In some embodiments, the subframe numbers, such as 0 to 1023, can be respectively assigned to successive data subframes and can be repeatedly used.

Figures 3A, 3B:
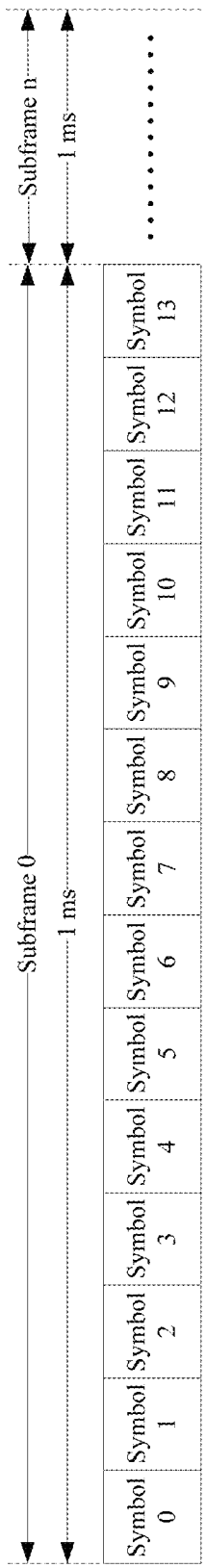
FIG. 3A schematically shows a configuration of data subframes and Orthogonal Frequency Division Multiplexing symbols according to an exemplary embodiment.
FIG. 3B schematically shows a data structure of a data packet according to an exemplary embodiment.

The transmitter 212 can pack the second demodulated data in one data subframe into a plurality of data packets, such as fourteen data packets. For example, each of the data subframes can include a plurality of OFDM symbols, such as fourteen OFDM symbols, and each OFDM symbol can be packed into one data packet. Each of the OFDM symbols in one data subframe can be assigned a unique OFDM symbol label, such as one of number 0 to number 13. FIG. 3A schematically shows an exemplary configuration of data subframes and OFDM symbols. In the example shown in FIG. 3A, a length of each data subframe is about one millisecond and includes fourteen OFDM symbols.

Each data packet can include a packet head and a packet body. The packet head can contain identification information and other information about the data packet. The packet body can contain actual effective data of the packet, e.g., the second demodulated data, that is to be transmitted. In some embodiments, the transmitter 212 can write a synchronization marker as the identification information into the packet head of a data packet to be transmitted and write the second demodulated data into the packet body of the data packet. The data in the packet body can be organized as data segments. In some embodiments, the packet head can further contain information indicating a length of the effective data packed in the data packet.

The synchronization marker can include any marker that is suitable for synchronization. In the scenario that each OFDM symbol is packed into one data packet, the synchronization marker can, for example, include a combination of the subframe number and the OFDM symbol label. FIG. 3B schematically shows an exemplary data structure of an OFDM symbol as an example of the data packet. In the example shown in FIG. 3B, the second demodulated data in the data packet is organized as twelve data segments, i.e., data0 to data11.

Consistent with embodiments of the disclosure, the transmitter 212 can transmit the data packets containing the second demodulated data to the first circuit 102. In some embodiments, when the combiner 214 of the first circuit 102 receives a data packet, the combiner 214 can obtain, e.g., read, the synchronization marker, such as the subframe number and the OFDM symbol label, from the packet head of the data packet and synchronize the second demodulated data contained in the data packet and the first demodulated data based on the synchronization marker, such as the subframe number and the OFDM symbol label.

Figure 4:
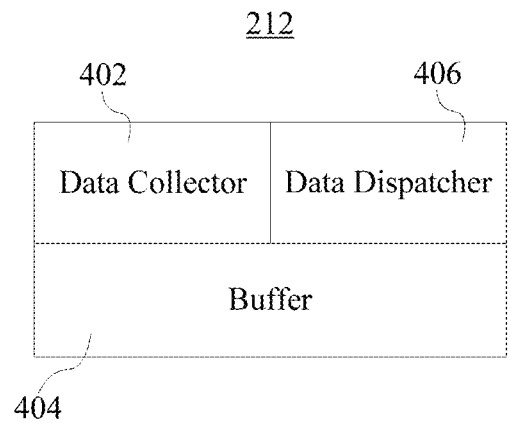
FIG. 4 shows a block diagram of a transmitter according to an exemplary embodiment.

FIG. 4 shows a block diagram of an example of the transmitter 212 consistent with embodiments of the disclosure. As shown in FIG. 4, the transmitter 212 includes a data collector 402, a buffer 404 coupled to the data collector 402, and a data dispatcher 406 coupled to the buffer 404. The data collector 402 is also referred to as a "data collecting circuit," and is configured to pack the second demodulated data into data packets and store the data packets into the buffer 404. The data dispatcher 406 is also referred to as a "data dispatching circuit," and is configured to read the data packets from the buffer 404 and transmit the data packets to the first circuit 102. The buffer 404 can include a ping-pong buffer configured to store the data packets in a ping-pong scheme. For example, the buffer 404 can include two storage sections, e.g., a first storage section and a second storage section. The data collector 402 can write data packets into the first storage section while the data dispatcher 406 reads data packets from the second storage section. After the data packets stored in the second storage are read, the data collector 402 can start to write data packets into the second storage section and the data dispatcher 406 can start to read data packets from the first storage section.

In some embodiments, the first demodulated data processed by the first circuit 102 can also include one or more synchronization markers, which are similar to the synchronization markers in the data packets transmitted by the transmitter 212. For example, the first demodulated data can also be in the form of data subframes and OFDM symbols. As described above, the data subframes are successively numbered according to processing time and are assigned successive subframe numbers, and each data subframe includes a plurality of OFDM. Thus, each OFDM symbol of the first demodulated data can be identified (marked) by the subframe number of the data subframe containing the OFDM symbol and the OFDM symbol label identifying the relative position of the OFDM symbol in the data subframe.

Thus, since the first antenna set 108 and the second antenna set 110 receive wireless signals from the same signal source, demodulated data generated in different data processing circuits but containing the same synchronization marker, such as an OFDM symbol in the first circuit 102 and an OFDM symbol received from the second circuit 102, corresponds to wireless signals received by the first antenna set 108 and the second antenna set 110 at about the same time. Therefore, by aligning the first demodulated data from the first circuit 102 and the second demodulated data from the second circuit 104 based on the synchronization markers, e.g., the subframe numbers and the OFDM symbol labels, contained in the first and second demodulated data, the combiner 214 can synchronize and properly combine the first demodulated data and the second demodulated data. For example, the combiner 214 can identify a first OFDM symbol from the first circuit 102 and a second OFDM symbol from the second circuit 104 that have the same subframe number and the same OFDM symbol label, and combine the first demodulated data in the first OFDM symbol with the second demodulated data in the second OFDM symbol to generate the combined data.

In the embodiments described above, subframe numbers and OFDM symbol labels are described as examples of the synchronization markers (identification information) for synchronizing the first demodulated data and the second demodulated data. In some other embodiments, other identification information can be used as the synchronization markers for synchronizing the first and second demodulated data.

Data handling and management between the first circuit 102 and the second circuit 104 consistent with embodiments of the disclosure will be described below. In some embodiments, after adding a packet head, the transmitter 212 can start to collect and add the second demodulated data to the packet body of the data packet. The collected data can be temporarily stored in a local storage of the second circuit 104, e.g., the buffer 404 of the transmitter 212. The local storage can include, for example, a random-access memory. When the length of the collected data reaches the length of one OFDM symbol, the transmitter 212 can send the completed data packet to the first circuit 102. In some embodiments, before the transmitter 212 sends the completed data packet to the first circuit 102, the second circuit 104 can check whether the first circuit 102 has enough storage space. If so, the transmitter 212 can send the completed data packet to the first circuit 102. If the first circuit 102 does not have enough storage space, the completed data packet can be kept in the local storage of the second circuit 104 until enough storage space becomes available at the first circuit 102.

In some embodiments, as shown in FIG. 2A, the data processing device 100 further includes a storage medium 218 associated with the first circuit 102 for storing the second demodulated data transmitted by the transmitter 212. Specifically, the storage medium 218 can be coupled to the back-end circuit 208 (specifically the combiner 214) such that the combiner 214 of the back-end circuit 208 can read the second demodulated data from the storage medium 218. In some embodiments, the storage medium 218 can be an internal storage medium included in the first circuit 102, e.g., the storage medium 218 is a part of the first circuit 102. In some other embodiments, the storage medium 218 can be an external storage medium independent of the first circuit 102, e.g., the storage medium 218 is not part of the first circuit 102. The storage medium 218 can include, for example, a double data rate (DDR) memory.

Thus, in the embodiments that involve the storage medium 218 associated with the first circuit 102, the transmitter 212 can transmit the data packets containing the second demodulated data to the storage medium 218. The data packets containing the second demodulated data can be stored in the storage medium 218 before being read by the combiner 214.

Depending on, for example, the processing speed of the back-end circuit 208, the data packets containing the second demodulated data may need to be stored in the storage medium 218 for a long time, and more data packets may be backlogged in the storage medium 218. Therefore, the storage medium 218 may require a large storage space. In order to reduce the amount of storage space required by the storage medium 218, a mutual storage management procedure can be implemented in the data processing device 100. For example, the second circuit 104 may stop transmitting data packets to the first circuit 102 and resume transmission after a certain signal from the first circuit 102 is received, as described in more detail below.

In some embodiments, after the transmitter 212 transmits one data packet to the storage medium 218 associated with the first circuit 102, the second circuit 104 can send a write-complete indication to the first circuit 102. The write-complete indication can be, for example, a pulse, such as an electric pulse, indicating that the write action for that data packet has completed. After sending the write-complete indication, the second circuit 104 can suspend the data transmission and wait for a response from the first circuit 102.

In some embodiments, after receiving the write-complete indication, the first circuit 102 can determine that a data packet containing the second demodulated data to be processed is stored in the storage medium 218. The combiner 214 of the back-end circuit 208 can read the data packet from the storage medium 218 and then process the data packet. After the combiner 214 reads the data packet from the storage medium 218, the first circuit 102 can send a read-complete indication to the second circuit 104. The read-complete indication can be, for example, a pulse indicating that the read action has completed and a storage space is freed for receiving a next data packet.

In some embodiments, certain previously-generated data packets containing the second demodulated data may have already been stored in the storage medium 218. The first circuit 102 does not have to wait for the write-complete indication to start reading data packets from the storage medium 218. Instead, the first circuit 102 can read the data packets from the storage medium 218 successively and send a read-complete instruction after reading one data packet.

In some embodiments, when a data packet containing the second demodulated data is generated but the second circuit 104 has not received the read-complete indication from the first circuit 102, the second circuit 104 can temporarily store that data packet in the local storage of the second circuit 104, e.g., the buffer 404, rather than sending that data packet to the storage medium 218 associated with the first circuit 102. Therefore, the local storage of the second circuit 104 functions as a back-up storage space for the first circuit 102. That is, the local storage of the second circuit 104 can be shared with the first circuit 102, and hence the storage space requirement of the storage medium 218 associated with the first circuit 102 can be reduced.

The write-complete indication and the read-complete indication can be transmitted between the first circuit 102 and the second circuit 104 through a connection link different from that for transmitting the data packets. In some embodiments, the connection interface 106 between the first circuit 102 and the second circuit 104 may include a plurality of connection links that may be of different types for transmitting different types of information. For example, the connection interface 106 can include a data link between the transmitter 212 and the storage medium 218 associated with the first circuit 102. The transmitter 212 can transmit the data packets through the data link. The connection interface 106 can further include an instruction link between the first circuit 102 and the second circuit 104. The instruction link can be a link different from the data link. The second circuit 104 can send the write-complete indication to the first circuit 102 through the instruction link. Correspondingly, the first circuit 102 can send the read-complete indication to the second circuit 104 also through the instruction link. The data link can include, for example, at least one of a USB interface, an HDMI, or a wireless link. The instruction link can include, for example, at least one of a cable or a wire.

Referring again to FIG. 2A, the first front-end circuit 206 includes a first pre-circuit 220 configured to pre-process the first data to generate first pre-processed data and a first demodulator 222 coupled to the first pre-circuit 220 and configured to demodulate the first pre-processed data to generate the first demodulated data. In some embodiments, as shown in FIG. 2A, the first pre-circuit 220 includes a first signal circuit 224 coupled to the first antenna set 108, a first fast Fourier transformer (FFT'er) 226 coupled to the first signal circuit 224, and a first channel estimator 228 coupled between the first FFT'er 226 and the first demodulator 222.

The first signal circuit 224 is configured to process the first data from the first antenna set 108 to, e.g., reduce or eliminate a distortion in the first data that may be caused by the first antenna set 108. For example, the first antenna set 108 may include a receiver chain that includes radio-frequency (RF) components. The RF components may not be ideal, which may cause mismatches between parallel sections of the receiver chain dealing with the in-phase (I) and quadrature (Q) phase paths, resulting in IQ imbalances. Further, the wireless signals received by the first antenna set 108 may include direct-current (DC) components, which may need to be eliminated before the wireless signals can be further processed. The IQ imbalance and/or the elimination of the DC components in the wireless signals may cause the distortion in the resulting first data, which can then be reduced or eliminated by the first signal circuit 224. For example, the first signal circuit 224 can process the first data by performing at least one of filtering, adjustment, analog-to-digital (AD) conversion, or sampling on the first data. The processing of the first data by the first signal circuit 224 is also referred to as a first signal processing.

Further, the first FFT'er 226 is configured to perform fast Fourier transform (FFT) on the first data that has been processed by the first signal circuit 224 to transform the first data from the time domain to the frequency domain. The first channel estimator 228 is configured to perform channel estimation for the first circuit 102 to obtain a channel value needed for demodulating the first data. The first demodulator 222 can then demodulate the first pre-processed data based on the estimated channel value.

Similarly, as shown in FIG. 2B, the second front-end circuit 210 includes a second pre-circuit 230 configured to pre-process the second data to generate second pre-processed data and a second demodulator 232 coupled to the second pre-circuit 230 and configured to demodulate the second pre-processed data to generate the second demodulated data. In some embodiments, as shown in FIG. 2B, the second pre-circuit 230 includes a second signal circuit 234 coupled to the second antenna set 110, a second FFT'er 236 coupled to the second signal circuit 234, and a second channel estimator 238 coupled between the second FFT'er 236 and the second demodulator 232.

The second signal circuit 234 is configured to process the second data from the second antenna set 110 to, e.g., reduce or eliminate a distortion in the second data that may be caused by the second antenna set 110, such as distortion resulting from IQ imbalances and/or DC components elimination. For example, the second signal circuit 234 can process the second data by performing at least one of filtering, adjustment, AD conversion, or sampling on the second data. The processing of the second data by the second signal circuit 234 is also referred to as a second signal processing.

Further, the second FFT'er 236 is configured to perform FFT on the second data that has been processed by the second signal circuit 234 to transform the second data from the time domain to the frequency domain. The second channel estimator 238 is configured to perform channel estimation for the second circuit 104 to obtain a channel value needed for demodulating the second data. The second demodulator 232 can then demodulate the second pre-processed data based on the estimated channel value.

In some embodiments, to reduce the cost for manufacturing the data processing device 100, the first circuit 102 and the second circuit 104 can be configured based on a same type of data processing circuit. That is, the second circuit 104 can also include a back-end circuit similar to the back-end circuit 208 of the first circuit 102. However, in these embodiments, the back-end circuit of the second circuit 104 can be disabled and the data in the second circuit 104 can be transmitted to the first circuit 102 after being demodulated by the second demodulator 232 without further processing by the back-end circuit of the second circuit 104.

In the embodiments described above, the data processing device includes two data processing circuits. A data processing device consistent with embodiments of the disclosure can include more than two data processing circuits. One of the data processing circuits serves as the primary (master) circuit like the first circuit 102, and the other two or more data processing circuits serve as the secondary (slave) circuits like the second circuit 104.

Figure 5:
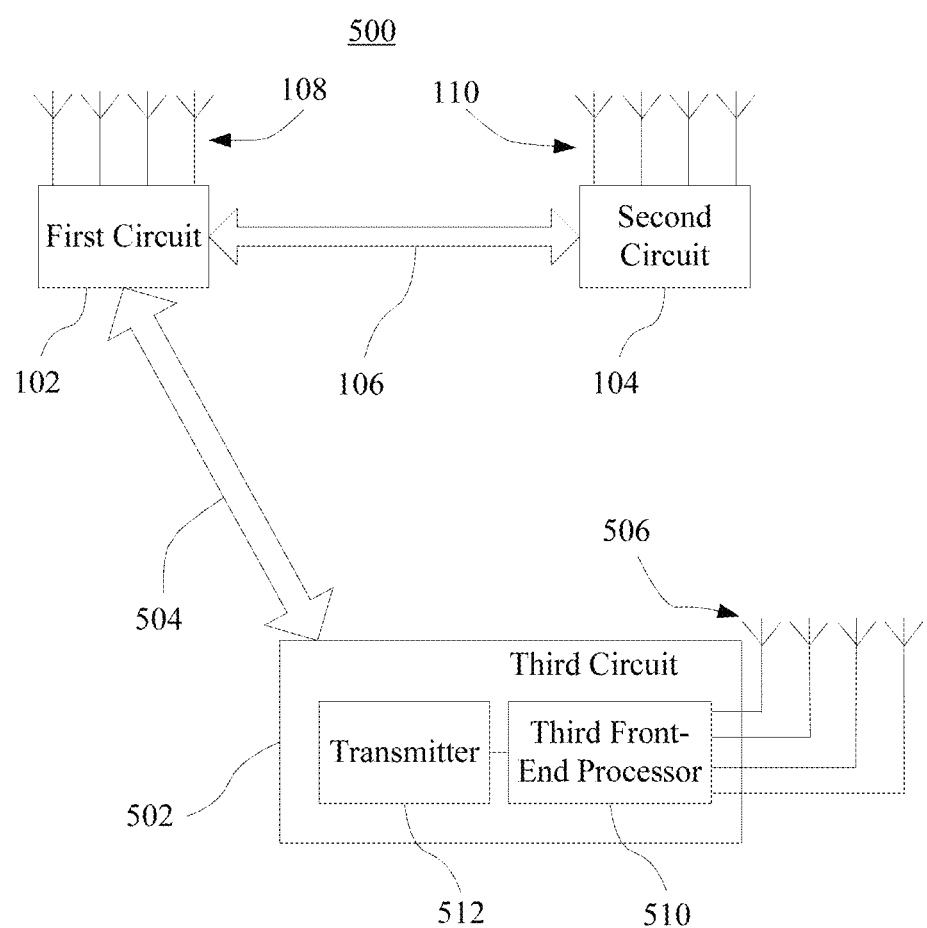
FIG. 5 is a schematic block diagram showing a data processing device according to another exemplary embodiment.

FIG. 5 is a schematic block diagram showing another exemplary data processing device 500 consistent with embodiments of the disclosure. The data processing device 500 can be, for example, a wireless communication system, and includes the first circuit 102, the second circuit 104 coupled to the first circuit 102 via the connection interface 106, and a third circuit 502 coupled to the first circuit 102 via another connection interface 504. The structure and function of the connection interface 504 can be similar to those of the connection interface 106, and thus detailed description thereof is omitted.

The data processing device 500 further includes the first antenna set 108 coupled to the first circuit 102, the second antenna set 110 coupled to the second circuit 104, and a third antenna set 506 coupled to the third circuit 502. The third antenna set 506 includes one or more antennas and is configured to receive the wireless signals. The third antenna set 506 can convert the received wireless signals to third data and send the third data to the third circuit 502 for further processing.

The third circuit 502 can have a structure similar to that of the second circuit 104. In some embodiments, as shown in FIG. 5, the third circuit 502 includes a third front-end circuit 510 and another transmitter 512 coupled to the third front-end circuit 510. The third front-end circuit 510 is configured to process the third data to obtain third demodulated data and the transmitter 512 is configured to transmit the third demodulated data to the first circuit 102. In some embodiments, the transmitter 512 transmits the third demodulated data to the storage medium 218 associated with the first circuit 102. The structure and function of the third front-end circuit 510 are similar to those of the second front-end circuit 210, and thus the detailed description thereof is omitted. Further, the structure and function of the transmitter 512 are similar to those of the transmitter 212, and thus the detailed description thereof is omitted.

In some embodiments, to separate the second demodulated data from the second circuit 104 and the third demodulated data from the third circuit 502, the storage medium 218 associated with the first circuit 102 can be physically separated into two or more storage spaces (storage sections), with one of the physically separated storage spaces being configured to store the second demodulated data and another one of the physically separated storage spaces being configured to store the third demodulated data.

Figure 6:
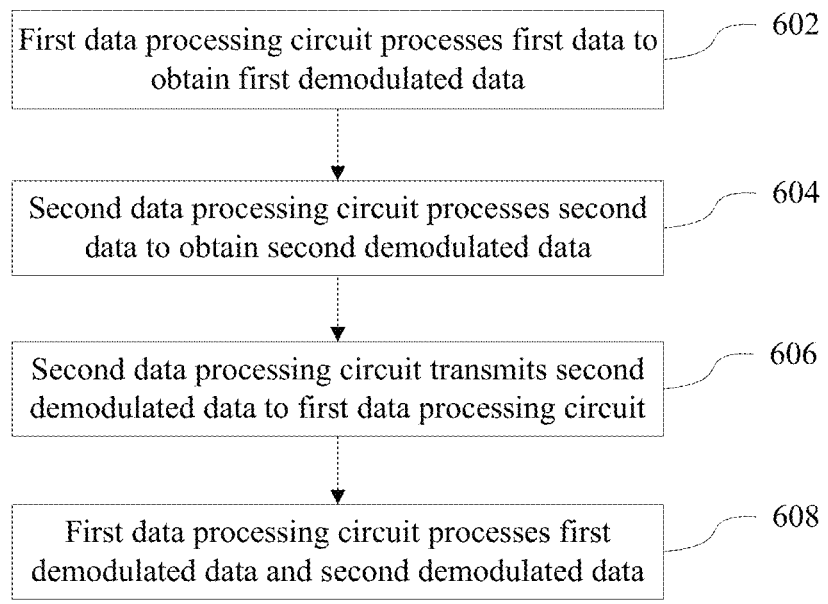
FIG. 6 is a flow chart of a data processing method according to an exemplary embodiment.

FIG. 6 is a flow chart of an exemplary data processing method 600 consistent with embodiments of the disclosure. The method 600 can be implemented in a data processing device consistent with embodiments of the disclosure, such as one of the exemplary data processing devices described above. As shown in FIG. 6, at 602, a first data processing circuit processes first data to obtain first demodulated data. The first data can be antenna data from a first antenna set and converted from wireless signals received by the first antenna set.

At 604, a second data processing circuit processes second data to obtain second demodulated data. The second data can be antenna data from a second antenna set and converted from the wireless signals received by the second antenna set.

At 606, the second data processing circuit transmits the second demodulated data to the first data processing circuit, e.g., through a connection interface between the first data processing circuit and the second data processing circuit. In some embodiments, the second data processing circuit transmits the second demodulated data to a storage medium associated with the first data processing circuit.

At 608, the first data processing circuit processes the first demodulated data and the second demodulated data. In some embodiments, the first data processing circuit synchronizes the first demodulated data and the second demodulated data, combines the synchronized first demodulated data and second demodulated data to generate combined data, and decode the combined data to obtain final processed data. In some embodiments, at least one of the first demodulated data or the second demodulated data is packed into data packets each having a packet head containing identification information, based on which the first demodulated data and the second demodulated data can be synchronized. The identification information can include, for example, a synchronization marker, such as the combination of a subframe number and an OFDM symbol label. In some embodiments, the second demodulated data is packed into data packets and synchronization markers are written into packet heads of the data packets. The first demodulated data is not packed but contains synchronization markers. The first data processing circuit can synchronize the first demodulated data and the second demodulated data based on the synchronization markers contained in the first demodulated data and the synchronization markers included in the packet heads of the data packets containing the second demodulated data.

Details of the data processing method according to the disclosure can be found in the description above related to the exemplary data processing devices, and thus detailed description of the data processing method is omitted.

Figure 7:
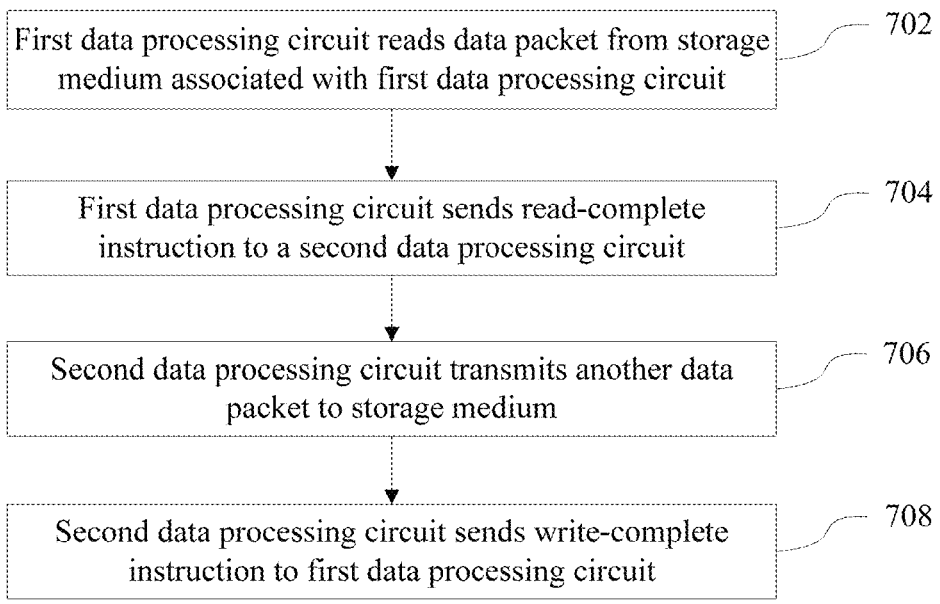
FIG. 7 is a flow chart of a data management method according to an exemplary embodiment.

FIG. 7 is a flow chart of an exemplary data management method 700 consistent with embodiments of the disclosure. The method 700 can be implemented in a data processing device consistent with embodiments of the disclosure, such as one of the exemplary data processing devices described above. As shown in FIG. 7, at 702, a first data processing circuit reads a data packet from a storage medium associated with the first data processing circuit. The first data processing circuit can then process the read data.

At 704, the first data processing circuit sends a read-complete instruction to a second data processing circuit. In some embodiments, the read-complete instruction includes a pulse indicating the data packet has been read. In some embodiments, the first data processing circuit can send the read-complete instruction to the second data processing circuit through an instruction link between the first data processing circuit and the second data processing circuit.

At 706, the second data processing circuit transmits another data packet to the storage medium. In some embodiments, the second data processing circuit can transmit the data packet through a data link between the second processing circuit and the storage medium. The data link can be different from the instruction link.

At 708, the second data processing circuit sends a write-complete instruction to the first data processing circuit. In some embodiments, the write-complete instruction includes a pulse indicating the data packet has been transmitted. In some embodiments, the second data processing circuit can send the write-complete instruction to the first data processing circuit through the instruction link.

Details of the data management method according to the disclosure can be found in the description above related to the exemplary data processing devices, and thus detailed description of the data management method is omitted.

According to the disclosure, multiple data processing circuits are coupled together to process data from multiple antennas. As such, each data processing circuit does not need to support many antennas and thus processing capability of the data processing circuit does not need to be very high. Nevertheless, the data processing device as a whole can support many antennas without the need for data processing circuits having a high processing capability. The number of antennas that the data processing device includes can impact, e.g., a capacity and/or a reception gain of the data processing device. For example, the capacity of the data processing device can be calculated using the following equation:

$$C = \log_2\left(1 + M \times \frac{S}{N}\right), \quad (1)$$

where M denotes the number of antennas and $$\frac{S}{N}$$

denotes the reception signal-to-noise ratio.

The reception signal-to-noise ratio may mainly be determined by the distance between the signal source and the antennas and the environment surrounding the wireless channel. When the signal-to-noise ratio is fixed, the capacity can mainly be increased by increasing the number of antennas.

Therefore, consistent with the disclosure, the performance of the data processing device can be improved using multiple low- or moderate-performance data processing circuits each coupled with a small or moderate number of antennas, without the need for a high-performance data processing circuit that has a high processing capability. Since the cost for increasing the processing capability of a single data processing circuit is usually higher than increasing the number of data processing circuits, the data processing device according to the disclosure can achieve a high processing capability without a high cost.

The processes shown in the figures associated with the method embodiments can be executed or performed in any suitable order or sequence, which is not limited to the order and sequence shown in the figures and described above. For example, two consecutive processes may be executed substantially simultaneously where appropriate or in parallel to reduce latency and processing time, or be executed in an order reversed to that shown in the figures, depending on the functionality involved.

Further, the components in the figures associated with the device embodiments can be coupled in a manner different from that shown in the figures as needed. Some components may be omitted and additional components may be added.

Other embodiments of the disclosure will be apparent to those skilled in the art from consideration of the specification and practice of the embodiments disclosed herein. It is intended that the specification and examples be considered as exemplary only and not to limit the scope of the disclosure, with a true scope and spirit of the invention being indicated by the following claims.

What is claimed is:

1. A data processing device comprising:
  a first circuit including:
    a first front-end circuit configured to process first data to obtain first demodulated data; and
    a back-end circuit coupled to the first front-end circuit and configured to receive the first demodulated data, the back-end circuit including a combiner coupled to the first-front-end circuit and a decoder coupled to the combiner; and
  a second circuit including:
    a second front-end circuit configured to process second data to obtain second demodulated data; and
    a transmitter coupled to the second front-end circuit and configured to transmit the second demodulated data to the first circuit,
  wherein:
    the back-end circuit is further configured to receive the second demodulated data;
    the combiner is configured to obtain a synchronization marker from the second demodulated data, synchronize the first demodulated data and the second demodulated data based on the synchronization marker, and combine the first demodulated data and the second demodulated data to generate combined data; and the decoder is configured to decode the combined data.

2. The data processing device of claim 1, wherein the first circuit further includes a storage medium coupled to the back-end circuit and configured to store the second demodulated data.

3. The data processing device of claim 2, wherein:
the transmitter is further configured to transmit the second demodulated data to the storage medium, and
the back-end circuit is further configured to read the second demodulated data from the storage medium.

4. The data processing device of claim 1, wherein the transmitter is further configured to pack the second demodulated data into data packets and transmit the data packets to the first circuit.

5. The data processing device of claim 4, wherein the transmitter is further configured to add a synchronization marker to a packet head of one of the data packets.

6. The data processing device of claim 5, wherein the data packets include Orthogonal Frequency Division Multiplexing (OFDM) symbols containing the second demodulated data.

7. The data processing device of claim 6, wherein:
the OFDM symbols are grouped into at least one data subframe, and
the synchronization marker includes at least one of a subframe number or an OFDM symbol label.

8. The data processing device of claim 4, wherein the second circuit is further configured to:
transmit the data packets to a storage medium of the first circuit, and
send a write-complete indication to the first circuit after transmitting one of the data packets to the storage medium.

9. The data processing device of claim 8, wherein the first circuit is configured to send a read-complete indication to the second circuit after the back-end circuit reads the one of the data packets from the storage medium.

10. The data processing device of claim 8, further comprising:
a data link between the transmitter and the storage medium,
wherein the transmitter is configured to transmit the data packets through the data link.

11. The data processing device of claim 10, further comprising:
an instruction link between the first circuit and the second circuit, the instruction link being different from the data link,
wherein:
the second circuit is configured to send the write-complete indication to the first circuit through the instruction link, and
the first circuit is configured to send the read-complete indication to the second circuit through the instruction link.

12. The data processing device of claim 1, further comprising:
one or more first antennas coupled to the first front-end circuit and configured to receive wireless signals, convert the received wireless signals to the first data, and send the first data to the first front-end circuit; and
one or more second antennas coupled to the second front-end circuit and configured to receive the wireless signals, convert the received wireless signals to the second data, and send the second data to the second front-end circuit.

13. The data processing device of claim 12, wherein:
the first front-end circuit includes:
a first pre-circuit configured to pre-process the first data from the one or more first antenna to generate first pre-processed data; and
a first demodulator coupled to the first pre-circuit and configured to demodulate the first pre-processed data to generate the first demodulated data, and
the second front-end circuit includes:
a second pre-circuit configured to pre-process the second data from the one or more second antennas to generate second pre-processed data; and
a second demodulator coupled to the second pre-circuit and configured to demodulate the second pre-processed data to generate the second demodulated data.

14. The data processing device of claim 13, wherein:
the first pre-circuit includes:
a first signal circuit configured to perform at least one of filtering, adjustment, analog-to-digital (AD) conversion, or sampling on the first data;
a first fast Fourier transformer (FFT'er) coupled to the first signal circuit and configured to perform fast Fourier transform (FFT) on the first data processed by the first signal circuit; and
a first channel estimator coupled between the first FFT'er and the first demodulator, and configured to perform a first channel estimation to obtain a first channel value for demodulating the first data, and
the second pre-circuit includes:
a second signal circuit configured to perform at least one of filtering, adjustment, analog-to-digital (AD) conversion, or sampling on the second data;
a second FFT'er coupled to the second signal circuit and configured to perform FFT on the second data processed by the second signal circuit; and
a second channel estimator coupled between the second FFT'er and the second demodulator, and configured to perform a second channel estimation to obtain a second channel value for demodulating the second data.

15. The data processing device of claim 1, wherein the first circuit is integrated in a first chip and the second circuit is integrated in a second chip.

16. A data processing method comprising:
processing, by a first circuit, first data to obtain first demodulated data;
processing, by a second circuit, second data to obtain second demodulated data;
transmitting, by the second circuit, the second demodulated data to the first circuit; and
processing, by the first circuit, the first demodulated data and the second demodulated data, including:
obtaining a synchronization marker from the second demodulated data, synchronizing the first demodulated data and the second demodulated data based on the synchronization marker, and combining the first demodulated data and the second demodulated data to generate combined data: and decoding the combined data.

* * * * *